Jan. 28, 1969   D. R. HUMPHREYS   3,424,432
FLUID-ROTATED FLUID DISTRIBUTORS
Filed Nov. 16, 1966   Sheet 1 of 2

Inventor
Donald R. Humphreys
By his Attorney
Carl E. Johnson

//
3,424,432
FLUID-ROTATED FLUID DISTRIBUTORS
Donald R. Humphreys, Topsfield, Mass., assignor to USM Corporation, Flemington, N.J., a corporation of New Jersey
Filed Nov. 16, 1966, Ser. No. 594,740
U.S. Cl. 253—31    4 Claims
Int. Cl. F03b 1/00

ABSTRACT OF THE DISCLOSURE

An elliptoidal wave generator for imparting a circumferential wave of radial deflection to a flexspline is provided with radial vanes responsive to axial fluid flow whereby the flexspline is relatively driven in rotation with respect to a splined coaxial reaction member or housing in which the flexspline is journaled. Accordingly, for example, the flexspline may rotatably carry a nozzle outlet, or be formed with an auxiliary inlet for metering auxiliary fluid to be proportionally introduced into a main outlet of the reaction member.

---

This invention relates to fluid control devices rotatably driven by fluid, and more especially as herein illustrated, to mechanism of this type employing harmonic drive transmission means for distributing, mixing or dispensing liquid. It will be understood that the two embodiments shown herein are selected merely for purposes of exemplification, and that the invention is not thus limited nor even restricted to liquid as the driving medium since it is applicable in principle in many differing mechanisms.

Harmonic drive transmissions, as disclosed for example in U.S. Letters Patents 2,906,143 and 2,959,065 granted upon applications of C. Walton Musser, comprise three basic elements: a circular spline, a coaxial flexspline having teeth meshing at spaced circumferential localities with teeth on the circular spline, and a wave generator for radially deflecting the flexspline into the tooth engagements and circumferentially progressing the localities of tooth engagement to provide an output in one of the elements. Such transmission assemblies have been found to be compact and reliable as well as versatile. It is accordingly a main object of the present invention to take advantage of these characteristics and provide a novel, economical yet efficient fluid circulator assembly wherein a wave generator serving as input member is adapted to be rotatably driven by the axial flow of fluid.

In accordance with this object a feature of the invention resides as herein shown, in the provision in a fluid circulator of a wave generator including radial impeller vanes upon which the fluid acts to impart rotation as it passes axially therethrough thus to rotate at a different speed a flexspine ouput member serving as a conduit for the effluence. By thus relying on an integral wave generator impeller, a reduced number of parts is required, and the circular spline teeth may be internally formed on a stationary member which functions as a housing for the few relatively moving members.

In accordance with a further feature of the invention, the flexspline may be adapted, as in a mixer or proportioning device, for instance, to receive at selected intervals of its rotational cycle, a second fluid to be metered into the main or driving stream of fluid.

The foregoing and other features of the invention will now be described with greater particularity in connection with only two of many possible illustrative embodiments, and with reference to the accompanying drawings thereof, in which.

It will be understood that, although the drawings are herein sectioned for the parts to be of steel, all or some of these parts may in fact be made of plastic or other material when so desired.

Figure 1:
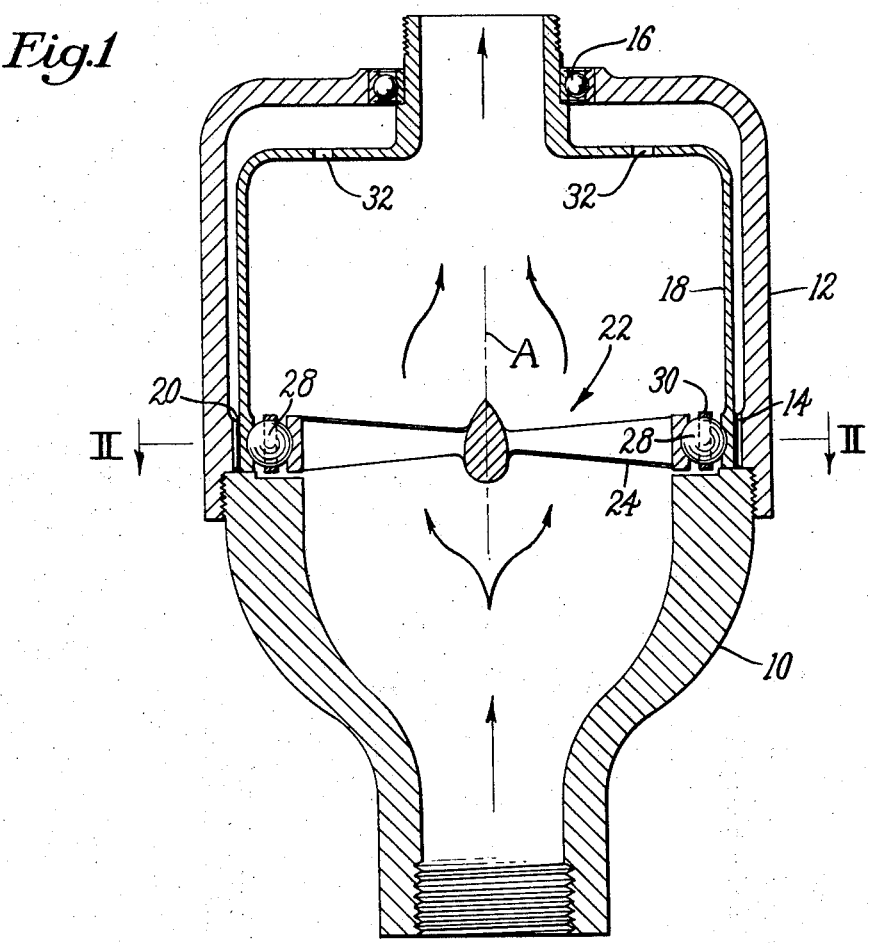
FIG. 1 is an axial section of a fluid motor dispenser, for instance a water springler, the outlet nozzle being omitted.

In FIG. 1 an inlet fitting 10 is internally threaded at its lower end to facilitate mounting on any suitable source of fluid under pressure such as a water pipe. Threaded onto the upper end of the inlet fitting 10 is a stationary cup-shaped housing 12. The latter is formed with internal spline teeth 14 (FIGS. 1 and 2) in circular configuration. Rotatably mounted in a bearing 16 (FIG. 1) journaled in the housing 12 is a flexspline 18. The lower end of this flexspline is provided with external spline teeth 20 which are less in number than those of the circular spline teeth 14 with which they cooperate. The difference in number will be understood to be equal to or a multiple of the number of circumferential localities in which the two sets of splines are in mesh.

In order to radially deflect the flexspline 18 into meshing relation at spaced circumferential localities, a wave generator-impeller generally designated 22 is employed which, when it rotates about a common axis A, also serves to progress the localities of spline tooth engagement circumferentially. It will be understood that, although an elliptoidal or two lobe form of wave generator is herein shown for simplicity, wave generators having three or more radially symmetric lobes may be used.

Figure 2:
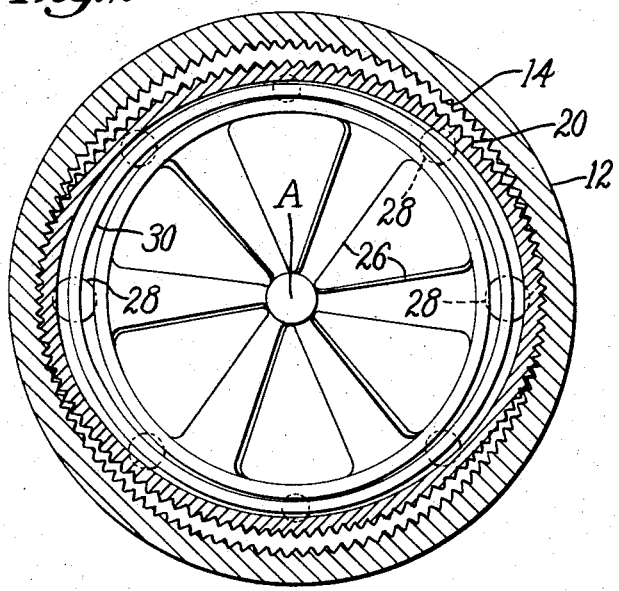
FIG. 2 is a section taken on the line II—II of FIG. 1 showing wave generator-impeller construction.

The wave generator 22 comprises, as shown in FIG. 2, a rotor or vaned impeller 24 having a plurality of radial blades 26 of suitable pitch and a series of differently sized bearing balls 28 arranged elliptoidally. For this purpose they have their inner race formed circularly on the impeller 24 and their outer race formed on the interior or mouth of the flexspline 18 so as to elliptoidally deflect the flexspline. The larger balls 28 are shown in FIG. 2 positioned to establish the major axis of the wave generator on the horizontal. It will be understood that preferably a ball separator 30 of suitable construction will maintain circumferential spacing of the balls as the wave shape is rotated in the flexspline.

The device of FIGS. 1 and 2 when employed as a water sprinkler, for example, would have an outlet nozzle mounting attached to the upper end of the flexspline 18. Flow through the fitting 10 is directed to and through the blades 26. These are disposed angularly to a plane normal to the rotor axis A so that the passing current imparts torque effective to rotate the impeller 24 about its axis. As a consequence the elliptoidal wave shape is rotated in the flexspline teeth 20. Since the housing 12 is stationary, the flexspline as a whole rotates to revolve its nozzle at a speed considerably reduced from that of the wave generator-impeller and dependent upon the rate of water flow to provide desired distribution as the nozzle rotates. It will be apparent that the device will operate in similar manner if the flowing medium is gaseous. Holes 32 (FIG. 1) are usually desirable in radial portions of the flexspline to equalize pressures internally and externally thereof and to aid in bearing lubrication.

In addition to providing fluid circulation, the flexspline may drive means for bodily propelling the entire device.

The device of FIG. 1 may be adapted for use as a rotary fluid distributor mountable directly over a pressure fluid exhaust vent, for instance. In this case the inlet fitting 10 can be omitted and the housing 12 provided with external mounting threads to enable the housing itself to serve as an adaptor.

It will be apparent that in a device such as shown in FIG. 1, if the flow in the passageway defined by the flexspline be reversed, the wave generator reverses and hence an outlet end of the flexspline also reverses rotation.

Although not so illustrated herein, it will be understood that in an alternate construction the flexspline may be held against rotation and only the wave generated shape rotated in the flexspline thereby to relatively drive a rotary circular spline 12 as the output member. In such an arrangement, of course, the circular spline 12 would itself be perforated to provide fluid outlets or it could carry one or more nozzles. It will also be apparent that the several embodiments, while usually advantageously employing tooth engagements between the relatively rotated flexspline and circular spline members, may relay on frictional or non-toothed engagement as, for instance, when slippage is not an important factor in design but low cost is essential.

Figure 3:
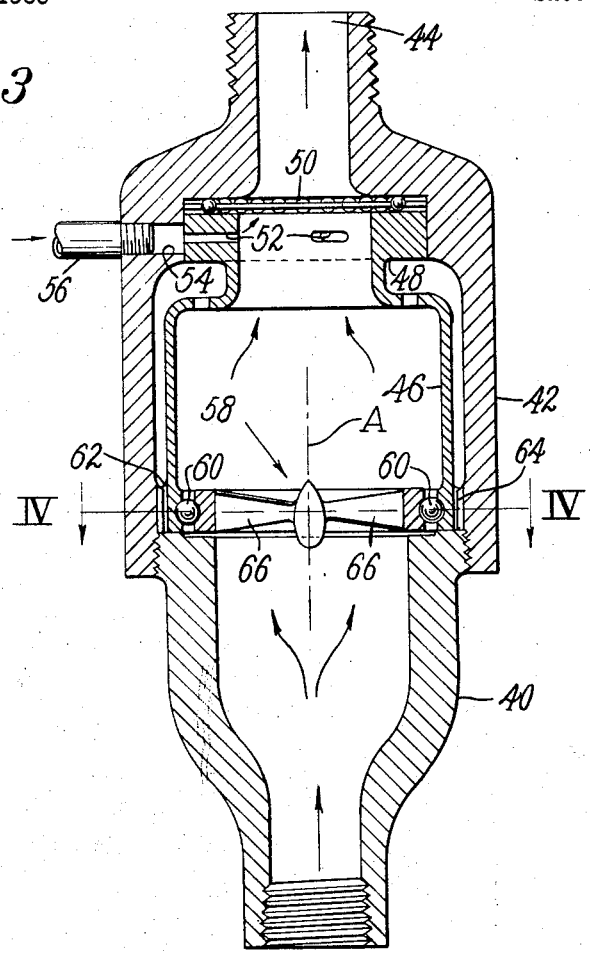
FIG. 3 is an axial section of a variant embodying a fluid proportioning device.
Figure 4:
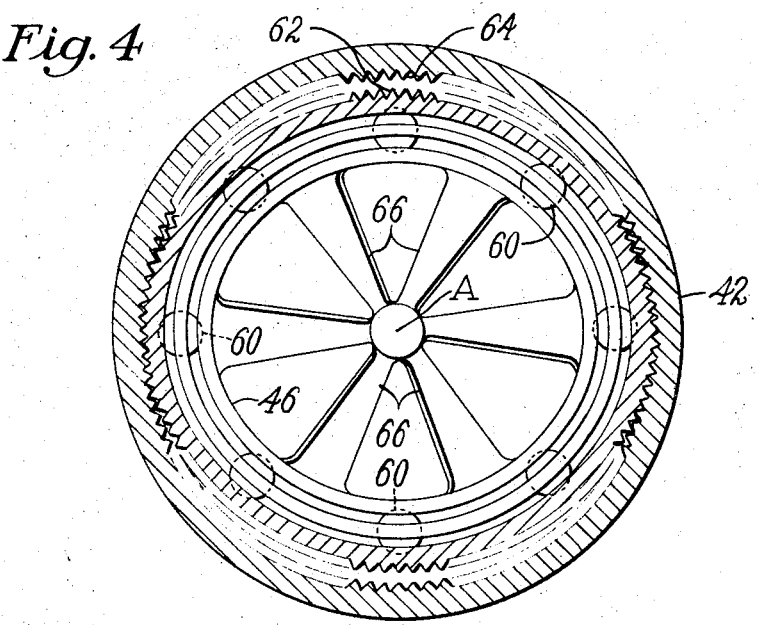
FIG. 4 is a section taken on the line IV—IV of FIG. 3.

FIGS. 3 and 4 illustrate a variant of the invention as adapted for fluid proportioning and mixing. Fluid is introduced in an inlet fitting 40 (FIG. 3). Threadedly secured on one end of the fitting is a stationary cylindrical housing 42 having an outlet 44. In this case a flexspline 46 coaxial with the housing 42 is formed with an upper hub 48 which functions as a metering valve and abuts one side of a thrust washer 50 seated in the housing. The hub 48 is illustrated in FIG. 3 as having three radial slots 52 (two shown, but any selected number may be used) arranged to afford communication successively with a bore 54 in the housing. It will accordingly be understood that a second fluid to be proportioned or mixed with the mainstream may be introduced via a conduit 56 threaded into the bore 54.

While the wave generator-impeller 22 of FIGS. 1 and 2 could also be employed in the device shown in FIGS. 3 and 4, an alternate wave generator-impeller construction 58 will next be described which uses bearing balls 60 of uniform size. The wave generator-impeller 58, incidentally, could also have been used in the device of FIGS. 1 and 2 if desired. Deflection of spline teeth 62 of the flexspline 46 into meshing relation at spaced circumferential localities with internal circular spline teeth 64 formed on the housing 42 is effected by the balls 60 running between an outer race formed internally of the mouth of the flexspline and an inner race formed on an elliptoidal periphery of the impeller 58. Radial, pitched vanes 66 of this impeller serve as above described, when acted on by inflow of the main stream, to impart torque to the wave generator and hence rotation of the flexspline 46 with its metering hub 48 at reduced speed.

In operation the device of FIGS. 3 and 4 will have an outflow substantially proportional to the pressure of the main stream flowing through the wave generator-impeller 58. Since the speed of rotation of the hub 48 is also proportional to the main stream flow, the fluid metered through the slots 52 will be added at a rate to maintain the outlet fluid with substantially uniform composition.

Although not illustrated herein, it will be apparent that a rotary outlet could extend from the hub 48 in the manner of the tubular outlet portion shown extending from the flexspline 18 of FIG. 1. Such an arrangement, in addition to mixing fluids, would rotatably distribute them. One of the many possible embodiments which may be mentioned by way of illustration is a crop sprinkling device wherein, to the main stream of water, is added a liquid fertilizer metered via the hub 48 and the composite liquid emitted through one or more rotating nozzles carried by the flexspline 46.

From the foregoing it will be clear that the invention provides a compact, trouble-free fluid driven device which may be easily assembled and maintained at relatively low cost.

Having thus described my invention, what is claimed is:

1. A device for rotatably dispensing fluid under pressure comprising, in coaxial relation, a fixedly mounted cup-shaped housing, a tubular flexspline having its inlet end provided with external spline teeth meshing at spaced circumferential localities with internal spline teeth formed on the housing, the flexspline having a smaller outlet, rotary end journaled in the housing, and a wave generator impeller rotatably mounted in the inlet end of the flexspline and adapted to be driven by axial flow of the fluid to be dispensed through said flexspline outlet end, the wave-generator-impeller acting to circuferentially propagate said localities of tooth meshing to differentially determine the rate of rotation of said outlet end.

2. A fluid circulating device comprising a housing, a nozzle-carrying tubular flexspline and fluid driven motor means for rotating the flexspline coaxially in the housing, said flexspline having circumferentially disposed spline teeth in spaced, meshing relation with spline teeth formed differentially in number on the housing, said motor means including an impeller rotatively responsive to axial fluid flow in the flexspline, the impeller being characterized by an effective periphery of at least one symmetric lobe for circumferentially propagating a locality of the spline tooth meshing whereby the flexspline rotates its nozzle at a rate approximately proportional to the flow rate of the fluid.

3. A device for rotatably dispensing fluid under pressure comprising, in coaxial relation a fixedly mounted cup-shaped housing, a tubular flexspline having its inlet end provided with external spline teeth meshing at spaced circumferential localities with internal spline teeth formed on the housing, the flexspline having a smaller outlet, rotary end journaled in the housing, said flexspline outlet end being formed with at least one auxiliary inlet successively communicating with a port formed in said housing, a wave generator impeller rotatably mounted in the inlet end of the flexspline and adapted to be driven by axial flow of main inlet fluid, the impeller circumferentially propagating said localities of both meshing to differentially determine the rate of rotation of said flexspline, and means for directing a second fluid through said housing port for porportioning with the main inlet fluid acting on said impeller.

4. A fluid flow device comprising, in harmonic drive relation, a stationary circular spline, a tubular flexspline rotatably supported therein and defining a fluid passage, a non-deflecting portion of the flexspine being formed with at least one auxiliary inlet, a port in the circular spline communicable with the auxiliary inlet, a wave generator rotatably mounted as an orifice in a deflectable end of the flexspline, said wave generator having impeller blades disposed to be acted on by the flow of fluid in the passage to rotate an outlet end of the flexspline, and means for introducing auxiliary fluid into said port to be metered into the main fluid flow in the flexspline during its rotation.

References Cited

UNITED STATES PATENTS

| | | | |
|---|---|---|---|
| 1,636,127 | 7/1927 | Fickle | 253—2 X |
| 1,919,246 | 7/1933 | Munz | 239—237 |
| 2,086,281 | 7/1937 | Nelson et. al. | 239—237 |
| 2,943,495 | 7/1960 | Musser | 74—640 X |
| 2,983,162 | 5/1961 | Musser | 74—640 |
| 3,255,969 | 6/1966 | Saad | 239—240 |
| 3,261,552 | 7/1966 | Hunter | 239—240 X |
| 3,272,437 | 9/1966 | Coson | 239—206 |
| 3,315,898 | 4/1967 | Costa | 253—31 X |

FOREIGN PATENTS 537,557  11/1931  Germany.

EVERETTE A. POWELL, JR., *Primary Examiner.*

U.S. Cl. X.R.

74—640; 239—237

PO-1050
(5/69)

UNITED STATES PATENT OFFICE
CERTIFICATE OF CORRECTION

Patent No. 3,424,432        Dated January 28, 1969

Inventor(s) Donald R. Humphreys

It is certified that error appears in the above-identified patent and that said Letters Patent are hereby corrected as shown below:

Column 4, Claim 3, line 39, change "both" to --tooth--;
Column 4, Claim 3, line 42, change "porpotioning" to --proportioning--;
Column 4, Claim 4, line 47, change "flexspine" to --flexspline--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents